(12) United States Patent
Yamaguchi et al.

(10) Patent No.: US 8,562,064 B2
(45) Date of Patent: Oct. 22, 2013

(54) VEHICLE INTERIOR PART

(75) Inventors: Mamoru Yamaguchi, Toyokawa (JP); Yoshiaki Maesoba, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 159 days.

(21) Appl. No.: 12/899,662

(22) Filed: Oct. 7, 2010

(65) Prior Publication Data

US 2011/0089713 A1    Apr. 21, 2011

(30) Foreign Application Priority Data

Oct. 16, 2009    (JP) ................................ 2009-239652

(51) Int. Cl.
*B60J 5/00*    (2006.01)

(52) U.S. Cl.
USPC ..................................................... 296/146.7

(58) Field of Classification Search
USPC ............. 296/146.7, 1.04, 146.1, 193.07, 153, 296/1.08, 39.1, 146.5, 24.34; 156/212, 245, 156/73.1, 78; 264/266, 46.5, 241, 101, 259
See application file for complete search history.

(56) References Cited

U.S. PATENT DOCUMENTS

| | | | | |
|---|---|---|---|---|
| 4,575,991 A * | 3/1986 | Hollingsworth | ................ | 53/509 |
| 4,642,951 A * | 2/1987 | Mortimer | ........................ | 52/145 |
| 5,695,865 A * | 12/1997 | Shimizu | ........................ | 428/212 |
| 5,730,431 A * | 3/1998 | Cattini | ............................ | 269/21 |
| 5,804,292 A * | 9/1998 | Ishitoya et al. | ............ | 428/304.4 |
| 5,976,289 A * | 11/1999 | Kawakubo et al. | ............. | 156/78 |
| 6,056,534 A * | 5/2000 | Johno | ............................. | 425/388 |
| 6,149,853 A * | 11/2000 | Luckett et al. | ................ | 264/266 |
| 6,170,902 B1 | 1/2001 | Sakuma et al. | | |
| 6,171,428 B1 * | 1/2001 | Shon | ............................. | 156/212 |
| 6,248,200 B1 * | 6/2001 | Dailey et al. | ................... | 156/245 |
| 6,986,547 B2 * | 1/2006 | Parrish | ..................... | 296/193.07 |
| 7,005,092 B2 * | 2/2006 | Dooley et al. | ................. | 264/46.5 |
| 7,077,456 B2 * | 7/2006 | Bailey et al. | .................. | 296/153 |
| 7,108,311 B2 * | 9/2006 | Dooley et al. | ............. | 296/146.7 |
| 7,159,914 B2 * | 1/2007 | Svenson | ....................... | 296/1.08 |
| 7,237,933 B2 * | 7/2007 | Radu et al. | .................... | 362/488 |
| 7,311,936 B2 * | 12/2007 | Niimi | .............................. | 427/71 |
| 7,431,379 B2 * | 10/2008 | Cowelchuk et al. | ........ | 296/146.7 |
| 7,572,401 B2 * | 8/2009 | Cowelchuk et al. | .......... | 264/241 |
| 7,658,426 B2 * | 2/2010 | Hayakawa et al. | .......... | 296/39.1 |

(Continued)

FOREIGN PATENT DOCUMENTS

| | | |
|---|---|---|
| JP | 6-075832 | 10/1994 |
| JP | 06-087020 U | 12/1994 |

(Continued)

OTHER PUBLICATIONS

Chinese Office action, mail date Aug. 1, 2012.

(Continued)

*Primary Examiner* — Kiran B Patel
(74) *Attorney, Agent, or Firm* — Greenblum & Bernstein, P.L.C.

(57) ABSTRACT

A door trim 10 having a side-impact absorption capability includes a base 22 having suction holes 23 and grooves 24 on a rear side between the adjacent suction holes 23. The base 22 is covered with a top cover 50 that is clung to a surface of the base 22 by applying vacuum through the suction holes 23. The suction holes 23 and the grooves 24 deform in conjunction with each other in a side collision and this improves the side-impact absorption capability.

4 Claims, 4 Drawing Sheets

(56) References Cited

U.S. PATENT DOCUMENTS

| | | | |
|---|---|---|---|
| 7,661,740 B2* | 2/2010 | Saito | 296/1.08 |
| 7,744,983 B2* | 6/2010 | Ota et al. | 428/192 |
| 7,753,435 B2* | 7/2010 | Hanna | 296/146.5 |
| 7,784,844 B2* | 8/2010 | Sato | 296/24.34 |
| 7,784,846 B2* | 8/2010 | Vasko et al. | 296/39.1 |
| 7,806,450 B2* | 10/2010 | Johnson et al. | 296/1.08 |
| 7,875,339 B2* | 1/2011 | Yuba et al. | 428/174 |
| 7,879,424 B2* | 2/2011 | Smith et al. | 428/71 |
| 7,971,923 B2* | 7/2011 | Mazur et al. | 296/146.7 |
| 8,002,330 B2* | 8/2011 | Arnold et al. | 296/146.7 |
| 8,029,037 B2* | 10/2011 | Sapak et al. | 296/1.08 |
| 8,071,002 B2* | 12/2011 | Boyer | 264/259 |
| 2002/0070583 A1* | 6/2002 | Brocklehurst | 296/146.7 |
| 2003/0116993 A1* | 6/2003 | Skarb et al. | 296/146.7 |
| 2003/0218356 A1* | 11/2003 | Emerling et al. | 296/146.1 |
| 2004/0169396 A1* | 9/2004 | Dooley et al. | 296/146.7 |
| 2005/0140167 A1* | 6/2005 | Jaggi | 296/146.7 |
| 2005/0140168 A1* | 6/2005 | Emerling | 296/146.7 |
| 2005/0161143 A1* | 7/2005 | Evans | 156/73.1 |
| 2007/0039245 A1* | 2/2007 | Buchta et al. | 49/502 |
| 2007/0046064 A1* | 3/2007 | Winborn | 296/146.7 |
| 2007/0137926 A1* | 6/2007 | Albin et al. | 181/290 |
| 2007/0267890 A1* | 11/2007 | Cowelchuk et al. | 296/146.7 |
| 2007/0278809 A1* | 12/2007 | Reed et al. | 296/1.08 |
| 2008/0315621 A1* | 12/2008 | Alvehav et al. | 296/146.7 |
| 2009/0295011 A1* | 12/2009 | Smith et al. | 264/101 |
| 2010/0144147 A1* | 6/2010 | Muneishi et al. | 438/689 |
| 2010/0225142 A1* | 9/2010 | Mazur et al. | 296/146.7 |

FOREIGN PATENT DOCUMENTS

| | | |
|---|---|---|
| JP | 10-175491 A | 6/1998 |
| JP | 11-048888 | 2/1999 |
| JP | 2000-313293 | 11/2000 |

OTHER PUBLICATIONS

Japan Office action, mail date is May 28, 2013, along with English-language translation thereof.

* cited by examiner

VEHICLE INTERIOR PART

CROSS REFERENCE TO RELATED APPLICATION

This application claims priority from Japanese Patent Application No. 2009-239652 filed on Oct. 16, 2009. The entire content of this priority application is incorporated herein by reference.

TECHNICAL FIELD

This disclosure is related to a vehicle interior part having a side-impact absorption capability.

BACKGROUND

A vehicle interior part disclosed in Japanese Published Utility Model Application No. H06-87020 is an example of vehicle interior part of this kind. This vehicle interior part is a vehicle door lining to which a center pad is attached and has a plurality of holes in a base plate of main body along a groove in which edges of the center pad are fitted and fixed. Because of the holes, the rigidity of the main body of the door lining decreases and thus an impact of side collision can be reduced. These holes are provided for vacuum application when attaching a top cover to the base plate surface of the door lining main body.

To improve a side-impact absorption capability of the above door lining in a side collision, a part of the door lining may need to be thinner in addition to providing those slits. If the thin part is provided irrelevantly to the locations of the slits, the thin part and the slits deform in no conjunction with each other in the side collision. Namely, an overall side-impact absorption capability of the door lining does not improve.

SUMMARY

The present invention was made in view of the foregoing circumstances. An object of the present invention is to provide a vehicle interior part having an improved side-impact absorption capability.

A vehicle interior part having a side-impact absorption capability includes a base having a plurality of suction holes and thin portions on a rear side between adjacent suction holes. The base is covered with a top cover that is clung to a surface thereof by applying vacuum through the suction holes.

By providing the thin portions between the adjacent suction holes, the thin portions and the suction holes deform in conjunction with each other. As a result, the side-impact absorption capability improves. Specifically, stress tends to concentrate on the thin portions in a side collision and thus the thin portions preferentially deform. Moreover, because the thin portions are provided between the adjacent suction holes to reduce partial clogging that may occur during plastic molding of the thin portions, an overall affect on the plastic molding is reduced as low as possible.

According to this vehicle interior part having the thin portions between the holes, the thin portions and the holes function in conjunction with each other in a side collision and thus the side-impact absorption capability improves.

BRIEF DESCRIPTION OF THE DRAWINGS

Illustrative aspects in accordance with the invention will be described in detail with reference to the following figures wherein.

DETAILED DESCRIPTION

Figure 1:
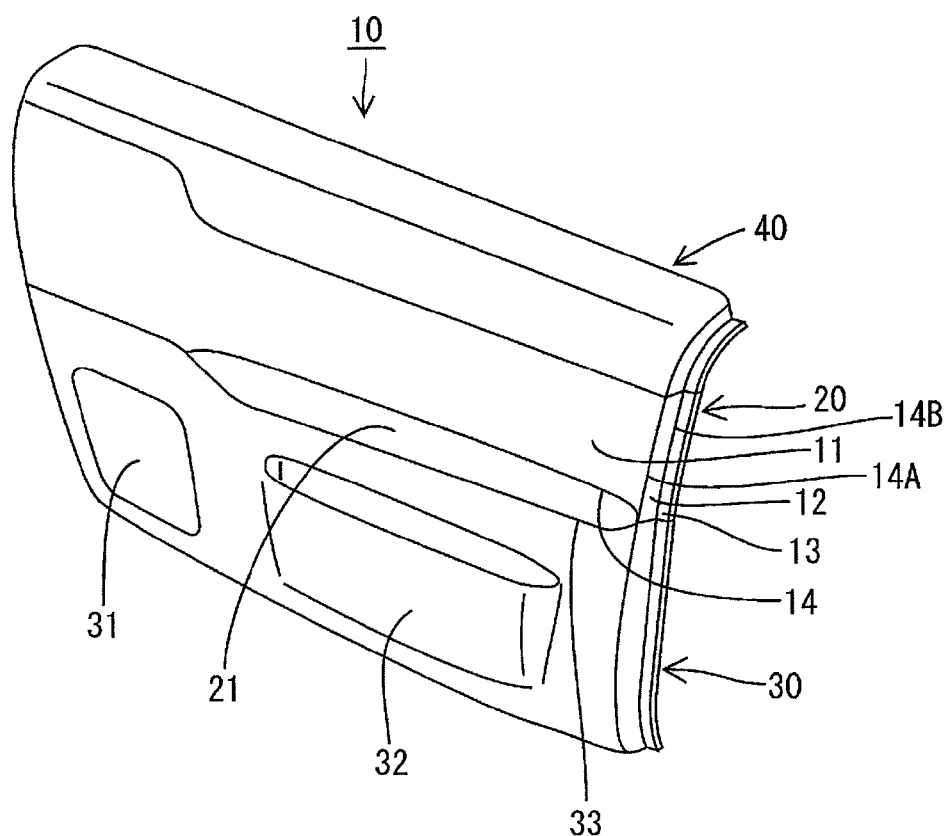
FIG. 1 is a perspective view illustrating a door trim viewed from the interior side of a vehicle according to one aspect of the invention.

An aspect of the present invention will be explained with reference to FIGS. 1 through 4. A door trim 10 in this aspect is an example of vehicle interior part. As illustrated in FIG. 1, the door trim 10 includes a middle board 20, a lower board 30 and an upper board 40. The lower board 30 is arranged under the middle board 20 and the upper board 40 is arranged above the middle board 20. The door trim 10 is constructed by connecting the middle board 20, the lower board 30 and the upper board 40 together. The door trim 10 is mounted to the interior side of a door panel (not shown) of a door and fixed with fixtures such as clips (not shown) or screws. A top cover 50 is attached to the surface of the door trim 10 on the interior side with a part or an entire area thereof glued to the surface.

The lower board 30 has a speaker grille 31 and a door pocket 32 arranged side by side in the front-to-rear direction of the vehicle. An armrest 33 protrudes from the lower part of the middle board 20 and the upper part of the lower board 30 toward the interior side of the vehicle. The armrest 33 has an armrest surface 21 on which occupants place their arms. The armrest surface 21 projects from the lower end of the middle board 20 toward the interior side of the vehicle.

The door trim 10 has a flat part 11, which is a main part of the door trim 10. A rising part 12 rises from an outer edge of the flat part 11 toward the exterior side of the vehicle. A flange part 13 extends outward from an edge of the rising part 12 located away from the flat part 11 substantially parallel to the flat part 11.

Figure 2:
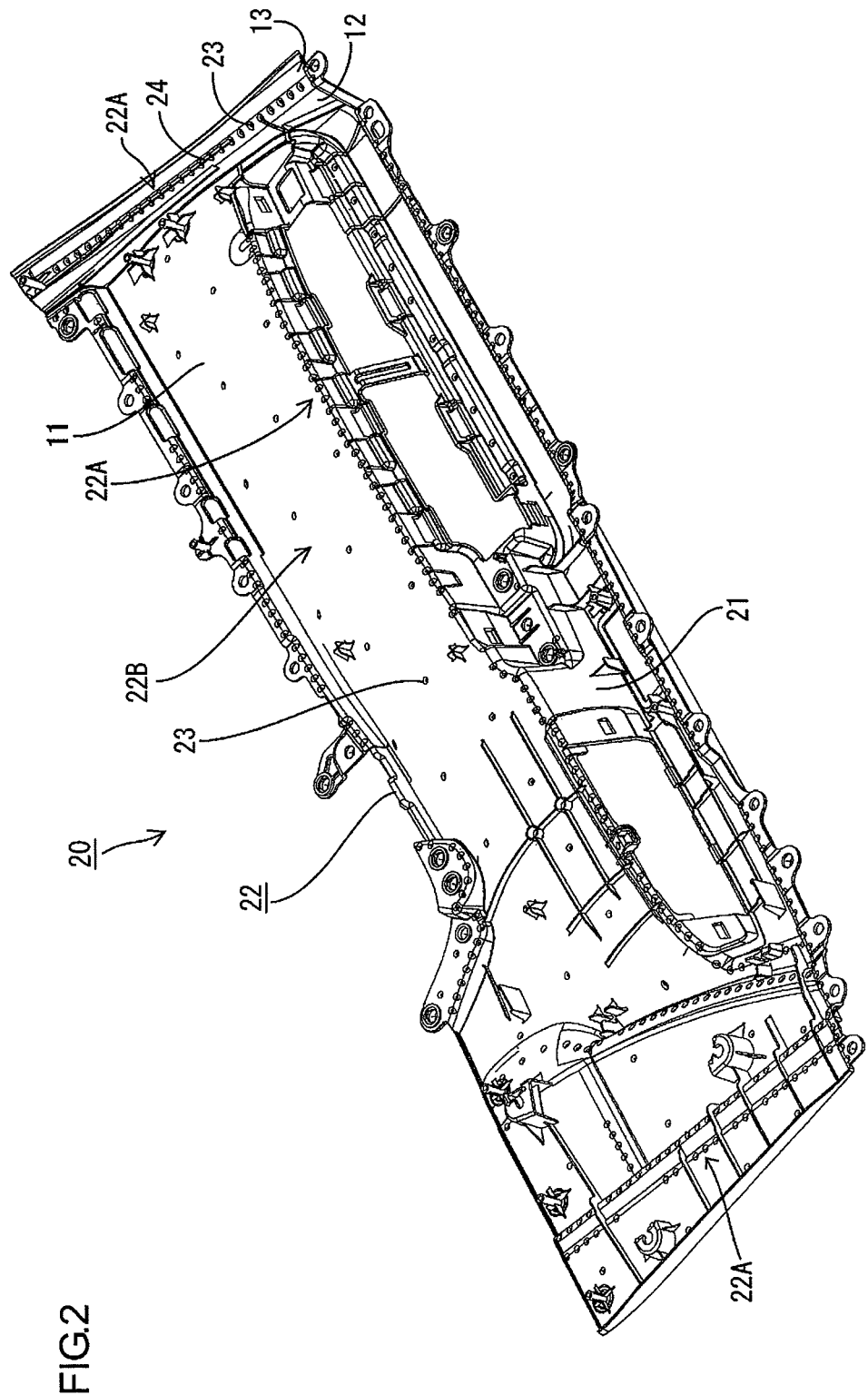
FIG. 2 is a perspective view illustrating a middle board viewed from the exterior side of the vehicle.

The middle board 20 includes a base 22 that is made of synthetic resin, such as polypropylene, and a mixture of wooden material and synthetic resin material. The rear of the base 22, that is, the exterior side of the base 22 is illustrated in FIG. 2. The base 22 has suction holes 23 that are through holes. The base 22 is set in a vacuum shaping mold (not shown) and the top cover 50 is placed over the base 22. When vacuum is applied through the suction holes 23, the top cover 50 is clung to the surface of the base 22. The top cover 50 is bonded to the surface of the base 22 with adhesive (not shown).

As illustrated in FIG. 2, the base 22 has dense areas 22A in which the suction holes 23 are formed in lines at small intervals and scattered areas 22B in which the suction holes 23 are scattered at larger intervals than the dense areas 22A. The scattered areas 22B are an example of thick portions. The scattered areas 22B are located in the flat part 11. The top cover 50 can be closely attached to the surface of the base 22 without applying a strong suction force. The dense areas 22A are located in corners 14 in boundary areas between a flat portion 11 and projecting portions that protrude from the flat portion 11. The projecting portions include the rising part 12 and the armrest surface 21. The boundary areas are bending portion of the base 22 at which the base 22 bends.

Because the top cover 50 is less likely to be closely attached to the corners 14, the dense areas 22A are provided so that a strong suction force can be applied the top cover 50 to closely attach the top cover 50 to the corners 14. Furthermore, a stress tends to concentrate on the corners 14 in a side collision and thus the corners 14 are more likely to deform. In the side collision, the corners 14 of the door trim 10 more preferentially deform than the flat part 11. However, if some parts of the corners 14 need to be intentionally deformed, those parts need to be configured so as to be more easily deformed as described below.

In this aspect, grooves 24 are provided between adjacent suction holes 23 in some parts of the dense areas 22A. The areas of the door trim 10 around the grooves 24 are an example of thin portions. The areas of the dense areas 22A in which the grooves 24 are formed have a thickness smaller than that of the scattered areas 22B and thus the rigidity thereof is lower than that of the scattered areas 22B. Moreover, the suction holes 23 and the grooves 24 are deformed in conjunction with each other and thus the corners 14 are more easily deformed in comparison to a case that the grooves 24 are not provided. The scattered areas 22B are relatively thicker than the areas in which the grooves 24 are provided. Therefore, the scattered areas 22B have higher rigidity and are less likely to be deformed.

Figure 3:
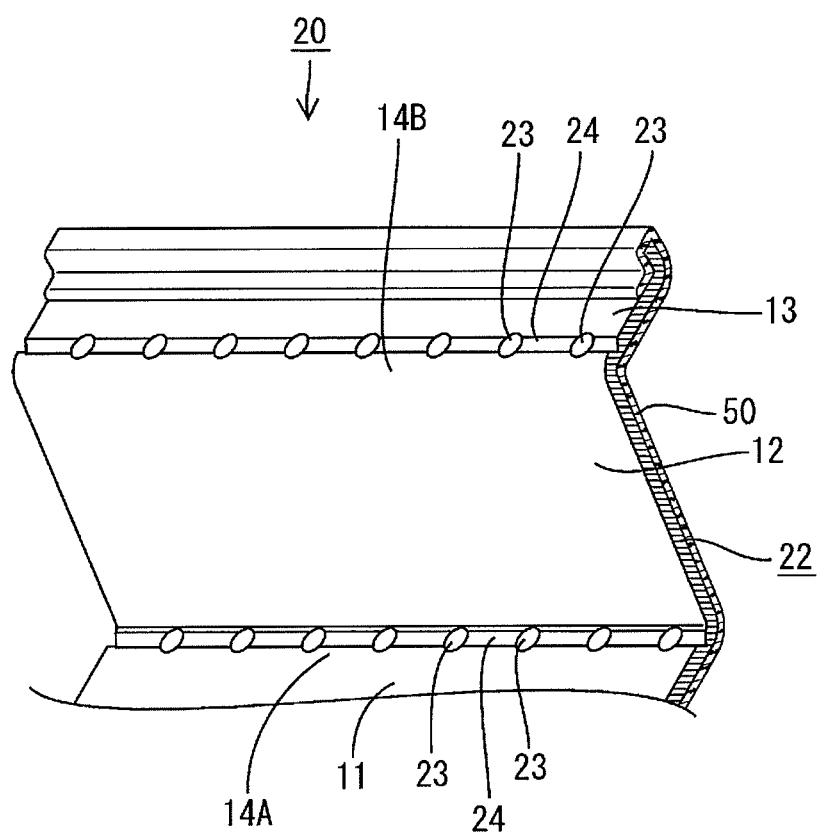
FIG. 3 is a perspective view illustrating a part of the middle board having grooves and suction holes viewed from the interior side of the vehicle.
Figure 4:
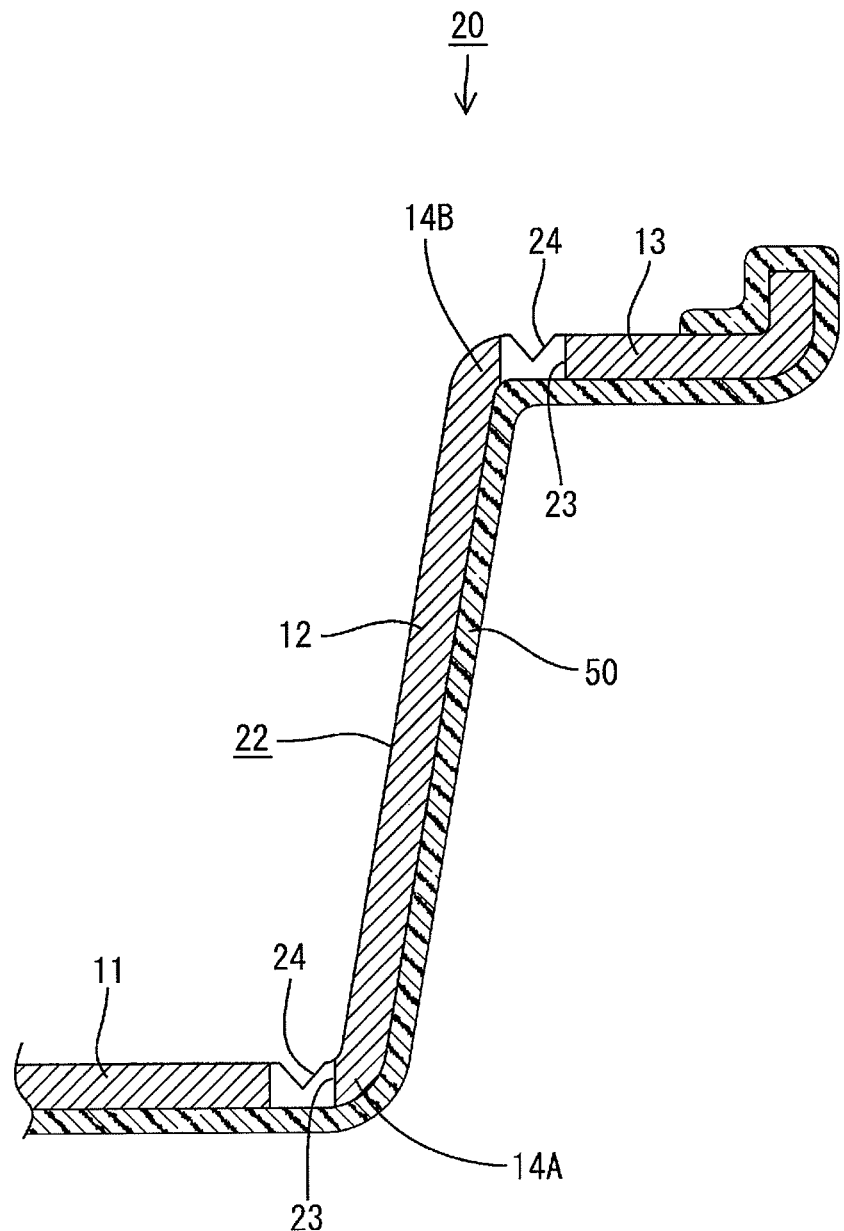
FIG. 4 is a cross-sectional view illustrating grooves and suction holes.

As illustrated in FIG. 2, the grooves 24 are provided near the rising part 12 on the farther side in FIG. 2 in the scattered areas 22A. As illustrated in FIG. 3, the grooves 24 are provided around the corner 14A in the boundary area between the flat part 11 and the rising part 12, and in the corner 14B around the boundary between the rising part 12 and the flange portion 13. More specifically, the grooves 24 are V-shaped cutouts as illustrated in FIG. 4. In a side collision, the dense areas 22A are more likely to be deformed than the scattered areas 22B. Especially the corners 14A and 14B in which the grooves 24 are provided in the dense areas 22A are more likely to be deformed first. As a result, the deformation of the base 22 is controlled.

When forming the grooves 24, flow passages for resin that form walls of the grooves 24 may become narrow during plastic molding. When the flow passages become narrow during plastic molding, the resin does not smoothly flow and insufficient mold may occur. Because the grooves 24 are formed only between the adjacent suction holes 23 in the dense areas 22A, the flow passages in which the resin may not flow smoothly are shorter than grooves that may be provided between the adjacent suction holes 23 in the scattered areas 22B. Namely, the affect of the grooves 24 on the plastic molding can be reduced as much as possible.

Next, the mechanism will be explained. First, a manufacturing method of the door trim 10 will be explained. A mold for molding the base 22 (the mold is not shown) is closed and a melted resin is injected into a mold cavity formed inside the mold. In this step, the resin flows into narrow spaces provided for forming the grooves 24. However, such narrow spaces exist only in some parts of the entire mold space and thus insufficient mold does not occur. The entire space is filled with the resin and the mold is opened after the resin is cooled. Then, the molded resin, that is, the base 22 is ejected from the mold.

Then, the base 22 is set in the vacuum forming mold and the top cover 50 is placed over the base 22. When vacuum is applied, the suction of the top cover 50 occurs via the suction holes 23 and the top cover 50 is clung to the surface of the base 22. The top cover 50 is tightly attached to the surface of the base 22. Because the suction holes 23 are densely arranged around the corners 14, the top cover 50 can be tightly attached to the surface of the corners 14. Adhesive is present between contact surfaces of the top cover 50 and the base 22. By hardening the adhesive, the top cover 50 adheres to the surface of the base 22. The grooves 24 are formed in the rear surface of the base 22 and thus outlines of the grooves 24 do not affect the surface of the top cover 50, that is, a design surface of the door trim 10 stays smooth.

In a side collision, the door panel is dented toward the door trim 10 side and the door trim 10 is pressed against an occupant. As a result, the door trim 10 deforms. Stress concentrates on the corners 14 (or the dense areas 22A) and thus the corners 14 deform before the deformation of the flat parts 11 (or the scattered areas 22B) occurs due to the shape of the base 22 (i.e., the arrangement of the suction holes 23). Especially, the corners 14A and 14B in which the grooves 24 are formed have lower rigidity and thus preferentially deform. Namely, the corners 14A and 14B in which the grooves 24 are provided are deformed with the lowest load and the overall impact absorption capability of the base 22 improves.

As described above, the grooves 24 are provided in parts of the dense areas 22A and thus the door trim 10 tends to deform around the grooves 24 in a side collision. Moreover, the grooves 24 are formed between the adjacent suction holes 23. The suction holes 23 and the grooves 24 deform in conjunction with each other and this improves the impact absorbing ability. Furthermore, the grooves 24 are formed using the suction holes 23, that is, holes other than the suction holes 23 are not required. The grooves 24 are formed in the dense areas 22A and thus the length of the passage through which the resin does not flow smoothly is shorter than the case that the grooves 24 are formed in the scattered areas 22B. Furthermore, the grooves 24 are formed around the corners 14A and 14B that are more easily deformed than the other parts. Therefore, the grooves 24 are more likely to deform than the case that the grooves 24 are formed in parts other than the corners 14.

<Other Aspects>

The present invention is not limited to the aspect explained above with reference to the drawings. For example, the following aspects may be included in the present invention.

The above aspect may be applied for pillar garnishes or quarter trims.

The grooves 24 may be formed in the scattered areas 22B. Alternatively, the grooves 24 may be formed in the corner 14 between the armrest surface 21 and the flat part 11 in the dense areas 22A.

The suction holes 23 may be formed at equal intervals.

The projecting portions may include a protrusion or a recess formed in a middle area of the flat part 11.

What is claimed is:

1. A vehicle interior part for use in a vehicle configured for side-impact absorption, comprising:
    a base including:
        a flat portion, the flat portion being a main portion of the base;
        a bending portion provided at a corner of the flat portion that bends relative to the flat portion;
        a plurality of suction holes that are provided in the flat portion and the bending portion; and
        a plurality of grooves that are provided in the bending portion and extend between the plurality of suction holes in the bending portion, wherein
        the plurality of suction holes provided in the bending portion are arranged in lines at spaced intervals and the plurality of suction holes provided in the flat portion are scattered and spaced at intervals larger than the spaced intervals of plurality of suction holes provided in the bending portion; and
    a top cover secured to a surface of the base.

2. The vehicle interior part according to claim 1, wherein the plurality of grooves are V-shaped.

3. The vehicle interior part according to claim 1, wherein the base further includes:
- a projecting portion that projects from an outer edge of the flat portion toward an exterior side of the vehicle when the vehicle interior part is mounted to the vehicle; and
- a flange portion that extends outward from an edge of the projecting portion located away from the flat portion and extending generally parallel to the flat portion, wherein the bending portion is provided between the projecting portion and the flange portion.

4. The vehicle interior part according to claim 1, wherein the vehicle interior part is a door trim.

* * * * *